United States Patent [19]

BeVier

[11] Patent Number: 4,511,375
[45] Date of Patent: Apr. 16, 1985

[54] PROCESS AND APPARATUS FOR DIRECT HEAT TRANSFER TEMPERATURE SWING REGENERATION

[75] Inventor: William E. BeVier, Kenmore, N.Y.

[73] Assignee: Union Carbide Corporation, Danbury, Conn.

[21] Appl. No.: 594,716

[22] Filed: Mar. 29, 1984

[51] Int. Cl.³ .............................................. B01D 53/08
[52] U.S. Cl. .......................................... 55/28; 55/34; 55/60; 55/77; 55/208; 55/390
[58] Field of Search .................... 55/28, 34, 60, 77, 79, 55/181, 208, 390

[56] References Cited

U.S. PATENT DOCUMENTS

| 2,616,515 | 11/1952 | Berg | 55/60 |
|---|---|---|---|
| 2,616,521 | 11/1952 | Berg | 55/79 X |
| 2,630,877 | 3/1953 | Berg | 55/79 X |
| 2,636,575 | 4/1953 | Watson | 55/79 |
| 3,093,465 | 6/1963 | Latta | 55/60 |
| 3,177,631 | 4/1965 | Tamura | 55/28 |
| 3,563,704 | 2/1971 | Torrence | 55/79 X |
| 4,012,206 | 3/1977 | Macriss et al. | 55/34 |
| 4,207,082 | 6/1980 | Okamoto et al. | 55/181 X |
| 4,231,764 | 11/1980 | Mattia | 55/28 |
| 4,256,606 | 3/1981 | Noack et al. | 55/74 X |
| 4,259,094 | 3/1981 | Nagai et al. | 55/181 |
| 4,306,886 | 12/1981 | Clyde | 55/60 X |
| 4,409,006 | 10/1983 | Mattia | 55/28 |

Primary Examiner—Robert Spitzer
Attorney, Agent, or Firm—Stanley Ktorides

[57] ABSTRACT

A process and apparatus which enables direct heat transfer temperature swing regeneration without unwanted mass transfer during heat exchange steps resulting in reduced energy and purge gas requirements.

19 Claims, 2 Drawing Figures 4,511,375

PROCESS AND APPARATUS FOR DIRECT HEAT TRANSFER TEMPERATURE SWING REGENERATION

TECHNICAL FIELD

This invention relates to the field of temperature swing regeneration of an impurity-laden adsorbent and is an improvement whereby energy efficiency is increased and purge gas usage is reduced.

BACKGROUND ART

An often used method of removing impurities from a gaseous stream is to pass such a stream through a mass of adsorbent. In this way the impurities are adsorbed and the stream is cleaned. Examples of such systems include removal of carbon dioxide and water vapor from an air feed to a cryogenic air separation plant, removal of contaminants from an enclosed air space such as a building, and dehydration of a gaseous stream (drying). After a while adsorbent used for such cleaning becomes saturated with impurities and can no longer perform the cleaning function. At this point the adsorbent itself must be cleaned of impurities, i.e., regenerated.

Many adsorbents exhibit a quality wherein their capacity to adsorb impurity decreases with increasing temperature. Such adsorbents may be regenerated by heating. As the impurity-laden adsorbent is heated its capacity to hold impurity decreases and the impurity is released from the adsorbent. Such an adsorbent regeneration system is termed temperature swing regeneration.

Temperature swing regeneration may be carried out either by direct or indirect heat transfer. Direct heat transfer is potentially more efficient because the impurity-laden adsorbent is heated by direct contact with the heating medium instead of through the walls of a heat exchanger. Also the heating medium can serve as the vehicle to carry off the desorbed impurity. However, direct heat transfer temperature swing regeneration has some drawbacks which have restricted its use to date.

A major problem with direct heat transfer temperature swing regeneration is inefficiency due to impurity transfer to the heating medium prior to the desired time. Preferably the impurity-laden adsorbent is preheated prior to its being stripped of the impurity. This enables the stripping step to be carried out more efficiently. Transfer of impurity to the heating medium during the preheating step is not desired as this contaminates the heating medium and results in the use of a larger amount of heating medium. This is expensive both from an energy standpoint and a material standpoint. Heating medium contamination by impurity during a preheating step is easily avoided when indirect heat transfer is employed because the heating medium and the impurity-laden absorbent are physically separated. However such contamination is a significant problem with direct heat transfer temperature swing adsorption.

Once the adsorbent has been cleaned, it is desirable to cool the absorbent so that it may be in condition to efficiently adsorb impurities from a gaseous stream. It is further desirable that such heat removed from the clean adsorbent be returned to the regeneration system so as to avoid an energy loss.

It is therefore an object of this invention to provide an improved direct heat transfer temperature swing regeneration system.

It is another object of this invention to provide an improved direct heat trnsfer temperature swing regeneration system wherein undesired mass transfer of impurity from the adsorbent to the heating medium is substantially avoided.

It is further object of this invention to provide an improved direct heat transfer temperature swing regeneration system wherein the cleaned adsorbent is efficiently cooled and the heat recovered for further use in the system.

It is a still further object of this invention to provide an improved apparatus suitable for carrying out a process to achieve the above-described objects.

SUMMARY OF THE INVENTION

The above and other objects which will become apparent to one skilled in the art upon a reading of this disclosure are attained by the instant invention one aspect of which is:

A processs for cleaning impurity-containing adsorbent by temperature swing regeneration comprising:

(1) providng impurity-containing adsorbent and clean purge gas;

(2) warming the impurity-containing adsorbent by direct heat transfer with warm purge gas to produce warm impurity-containing adsorbent and cool purge gas;

(3) heating the cool purge gas to produce hot purge gas;

(4) cleaning the warm impurity-containing adsorbent by contact with the hot purge gas to produce clean adsorbent and impurity-containing purge gas; and (5) cooling the clean adsorbent by direct heat transfer with the clean purge gas to produce clean cool adsorbent and the warm purge gas of step (2).

Another aspect of this invention is:

An apparatus for temperature swing regeneration of impurity-laden adsorbent by direct heat transfer with purge gas comprising: a vessel having a preheating zone, a stripping zone and a recuperating zone, said preheating zone having a gas outlet at one end and a gas inlet at the opposite end, said stripping zone having a gas inlet at one end and, at the other end, gas collection means in flow communication with a gas outlet, said recuperating zone having a gas inlet at one end and, at the other end, gas collection means in flow communication with a gas outlet, said recuperating zone gas outlet in flow communication with said preheating zone gas inlet.

As used herein, the term "direct heat transfer" means the transfer of heat through physical contact between a warmer entity and a cooler entity. That is, the heat is not conducted through an impermeable barrier between the two entities.

As used herein, the term "fixed bed" means a bed in which the adsorbent particles are stationary relative to the vessel containing them.

As used herein, the term "moving bed" means a bed in which the adsorbent particles change position relative to the vessel containing them.

DETAILED DESCRIPTION

The process and apparatus of this invention will be described in detail with reference to the drawings.

Figure 1:
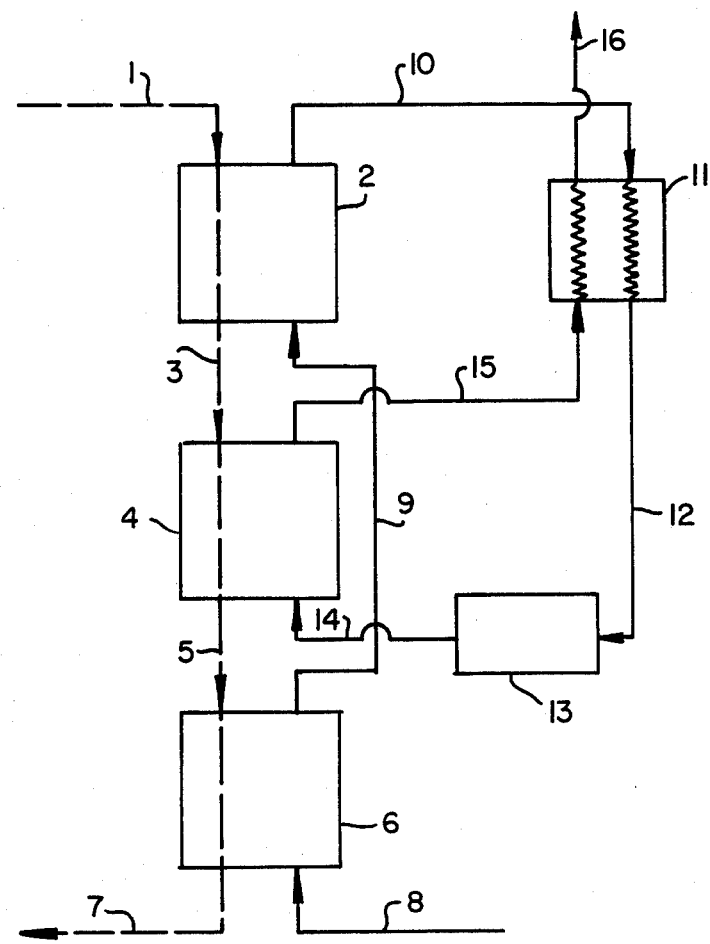
FIG. 1 is a schematic representation of one preferred embodiment of the direct heat transfer temperature swing regeneration system of this invention.

Referring now to FIG. 1, the process of this invention employs the direct contact of adsorbent and purge gas in each of three separate zones: a preheating zone 2, a stripping zone 4 and a recuperating zone 6. The three zones may be in a fixed bed arrangement or in a moving bed arrangement.

Impurity-containing adsorbent 1 is introduced into preheating zone 2. Any adsorbent which displays a decreased adsorption capacity with increased temperature is suitable for use with the process of this invention. Among such adsorbents one can name molecular sieve, silica gel, activated carbon and the like.

The term "impurity" does not necessarily connote an undesired substance. Often it is desired to recover the impurity for other use. A typical example of an impurity-containing adsorbent is molecular sieve laden with carbon dioxide and/or water vapor from the cleaning of an air feed to a cryogenic air separation plant.

In preheating zone 2 the impurity-containing adsorbent 1 is contacted with warm purge gas 9 from the recuperating zone 6. The purge gas may be any effective gas which is substantially inert to the adsorbent. In the typical example mentioned above the purge gas may be clean and dry air, nitrogen or oxygen. The direct heat transfer from warm purge gas 9 to impurity-containing adsorbent 1 in preheating zone 2 results in warm impurity-containing adsorbent 3 and cool purge gas 10.

There is little or no net mass transfer of impurity from the adsorbent to the purge gas during the preheating step, while good heat transfer takes place. The warm purge gas passes countercurrently to the cold adsorbent so that both the adsorbent and the purge gas are at their warmest near the bottom of the preheating zone 2 and are at their coldest near the top of this zone. The terms bottom and top are used here for clarity with reference to the vertically oriented FIG. 1 schematic. The mass transfer behavior is such that, at a given temperature, the amount of a given component capable of being held by an adsorbent is a function of the concentration of the component in the gaseous atmosphere surrounding the adsorbent. This equilibrium loading generally increases as the gas phase concentration increases. At a lower temperature, the adsorbent is capable of holding more of the given component, or, restating, the gas phase concentration is lower for the same loading. At some point in the preheating zone 2, the equilibrium between gas concentration and loading is reached. However, on either side of this point, there is a driving force towards equilibrium, so that the net mass transfer is equal to zero.

At the bottom part of preheating zone 2, warm clean purge gas is in contact with warm impurity-containing adsorbent. The driving force toward equilibrium causes the impurity to desorb, i.e., increase the gas phase concentration. As the urge gas moves upward, it is becoming dirtier, i.e. more impurity laden. At the same time, the gas sees cooler adsorbent which requires for equilibrium a lower gas concentration than the warm adsorbent below it. In this way equilibrium between the adsorbent and the purge gas with respect to the impurity is reached at a point within the preheating zone.

Above the equilibrium point, the relatively dirty purge gas is seeing even cooler adsorbent, so the driving force is towards removal of impurity from the gas. By the time the top of the preheater is reached, the adsorbent is at its coldest, so its loading capacity is highest. Essentially all the impurity that was desorbed in the warmer bottom part of the preheater has been readsorbed in the cool, upper part. If the temperature of the purge gas entering he preheating zone is too high, the gas will contain enough heat to desorb the particles as well as heat them, without reaching equilibrium. In this case, there will be a significant transfer of mass from particle to gas. If the entering temperature is too low, the gas will not become dirty, but it also will not accomplish the desired heat transfer. The appropriate temperature is that which will provide the required sensible heat to the adsorbent to heat it from adsorber operating temperature to stripping temperature. One skilled in the art can readily calculate this temperature using the heat capacities of the gas and adsorbent.

The warm impurity-containing adsorbent 3 is transferred to stripping zone 4. The cool purge gas 10 is warmed in heat exchanger 11 by indirect heat transfer with hot impurity-containing purge gas 15 and the warm purge gas 12 is heated by heater 13 to produce hot purge gas 14. The heat exchange in the exchanger 11 serves to enhance the energy efficiency of the system by recovering the heat from the impurity-containing purge gas before it is removed from the system. The heat added to purge gas 12 in heater 13 is an amount of heat necessary to cause the impurity-containing adsorbent in the stripping zone to release the impurity. One skilled in the art can calculate how much to heat the purge gas from the type of adsorbent and impurity and from calculated heat loss outside the system in order to insure attainment of the heat of desorption of the adsorbent.

In stripping zone 4 the warm impurity-containing adsorbent 3 is contacted with the hot purge gas 14. This causes the impurity to be released by the adsorbent and the impurity is taken up and removed with the purge gas. The stripping step results in the formation of impurity-containing purge gas 15 and clean adsorbent 5.

The adsorber operating temperature is conveniently near ambient temperature, or from about 280° K. to 320° K. The stripping temperature is determined by the equilibrium isotherms, described above, for the particular impurity and adsorbent used. There should be a driving force towards equilibrium, that is, desorption, at all points in the stripper. A certain gas concentration and adsorbent loading is associated with each point; the stripping temperature should be greater than the equilibrium temperature for all of these points.

As mentioned above the heat added at the stripping zone is equal to the heat required to attain desorption. Theoreticlaly, it would be best to add the heat as it is needed along the height of the stripping zone. However, it is more practical to introduce all the necessary heat with the entering purge gas at the bottom of the stripping zone. As such, the purge gas is typically warmer upon entering than upon leaving stripping zone 4.

The impurity-containing purge gas 15 then is removed from the system as stream 16. In order to enhance energy efficiency, the impurity-containing purge gas may, as discussed previously, be passed through heat exchanger 11 to indirectly heat cool purge gas 10 prior to its removal from the system as stream 16.

The clean but still warm adsorbent 5 is transferred to recuperating zone 6 wherein there is fed clean cool purge gas 8. In recuperating zone 6 the warm clean adsorbent 5 is contacted with the clean cool purge gas 8 to produce clean cool adsorbent 7 and clean warm purge gas 9 which is passed to the preheating zone 2 as discussed previously. The clean cool adsorbent 7 is now ready for further use to clean a gaseous stream of impurities.

By use of the process of this invention one can now regenerate adsorbent by direct heat transfer with high energy efficiency and reduced amounts of purge gas. This is accomplished by keeping the purge gas free of impurity until it enters the stripping step while still directly contacting the purge gas with the adsorbent in both the recuperating and the preheating zones to carry out the energy efficient heat transfer. There is no contamination of the purge gas in the recuperating zone because the adsorbent here is clean. There is no significant contamination of the purge gas in the preheating zone because the temperature profiles of both the purge gas and the adsorbent are such as to cause very little or no net transfer of impurity from adsorbent to purge gas. The process is very energy efficient because neither the clean adsorbent nor the impurity-containing purge gas leaving the system take net system heat with them. Virtually the only heat loss is due to system sensible heat leak. The system heat is transferred within the system in a defined manner such that heat transfer and mass transfer are each carried out in their most efficient mode. The result is regenerated adsorbent by temperature swing regeneration with minimal energy and purge gas usage.

In Table I there are tabulated calcuated process conditions for the process of this invention wherein the impurity is carbon dioxide, the adsorbent is 13x molecular sieve, and the purge gas is nitrogen. The stream numbers refer to the numerals of FIG. 1. As can be seen the adsorbent is effectively cleaned of the impurity while very little heat is removed from the system by the exiting streams.

TABLE I

| Stream | Flow Rate (lbs/hr) | | | Temp. °F. |
| --- | --- | --- | --- | --- |
| | Molecular Sieve | $N_2$ | $CO_2$ | |
| 1 | 5200 | — | 109 | 40 |
| 3 | 5200 | — | 109 | 586 |
| 5 | 5200 | — | — | 587 |
| 7 | 5200 | — | — | 42 |
| 8 | — | 5200 | — | 40 |
| 9 | — | 5200 | — | 587 |
| 10 | — | 5200 | — | 42 |
| 12 | — | 5200 | — | 532 |
| 14 | — | 5200 | — | 638 |
| 15 | — | 5200 | 109 | 587 |
| 16 | — | 5200 | 109 | 96 |

Figure 2:
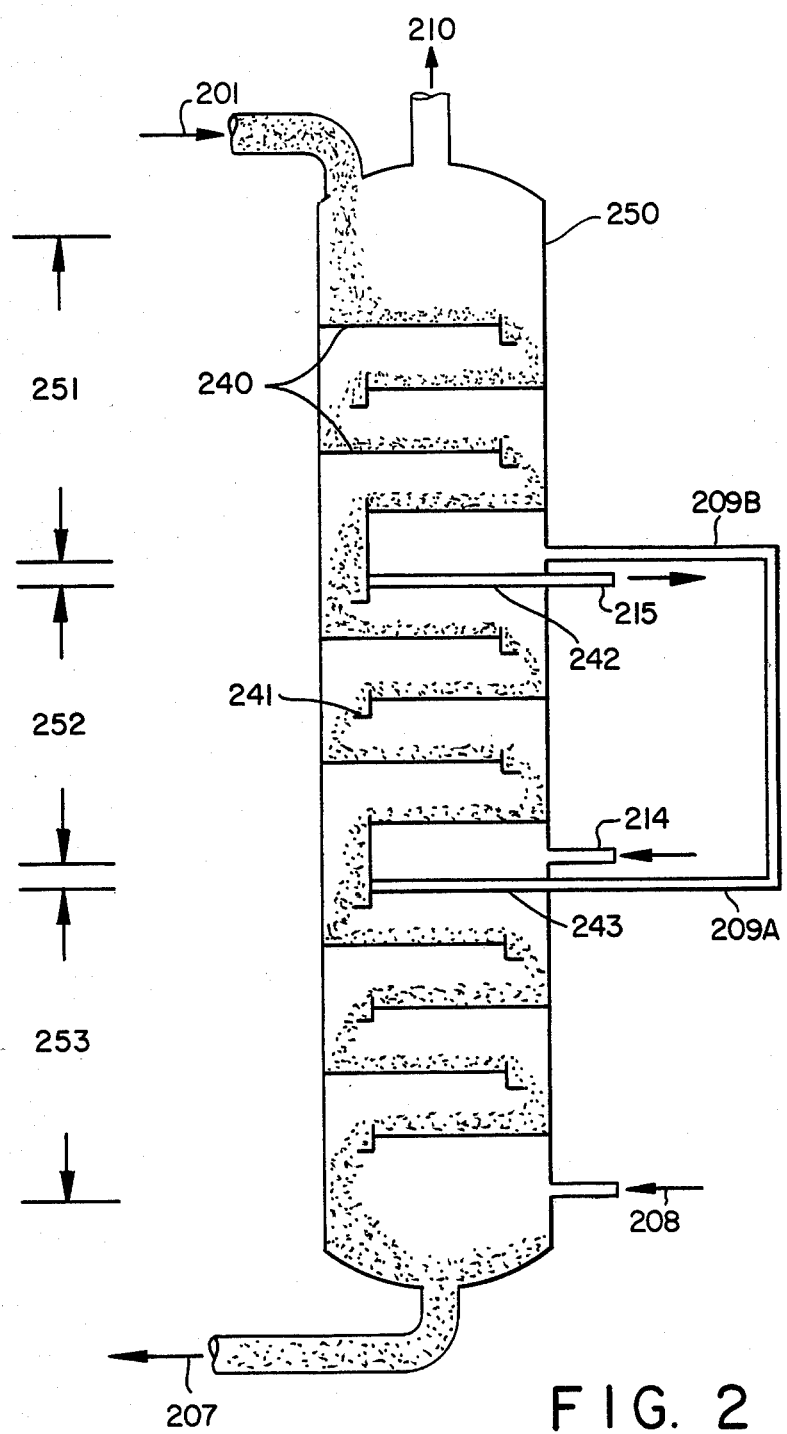
FIG. 2 is a cross-sectional view of a preferred embodiment of an apparatus suitable for the direct heat transfer temperature swing regeneration system of this invention.

FIG. 2 illustrates one preferred embodiment of the apparatus of the direct heat transfer temperature swing regeneration system of this invention. The apparatus of FIG. 2 is a moving bed, vertically oriented, cylindrical regenerator.

Referring now to FIG. 2, cylindrical, vertically oriented vessel 250 is divided into preheating zone 251, stripping zone 252 and recuperating zone 253. The cross-section of vessel 250 is preferably circular or rectangular. Each zone contains a plurality of vertically-spaced horizontally-oriented trays 240 which are attached to one or the other side of vessel 250 in alternating sequence and extend through less than the complete cross-section of vessel 250. Adsorbent inlet 201 communicates with the top of preheating zone 251 and adsorbent outlet 207 communicates with the bottom of recuperating zone 253.

At the bottom of recuperating zone 253 is purge gas inlet 208. Purge gas entering through inlet 208 travels up through recuperating zone 253 and is collected at the top of recuperating zone 253 in collection means 243 which may be any effective known gas collection means such as Johnson screen laterals or other collection means known to those skilled in the art. Gas outlet 209A communicates with gas collection means 243 so as to cause purge gas collected in the collection means to pass out of vessel 250. Gas outlet 209A communicates with gas inlet 209B located at the bottom of preheating zone 251. This causes purge gas to flow into preheating zone 251 at the bottom and flow upward through the preheating zone and out through gas outlet 210 communicating with the top of preheating zone 251. The purge gas entering the preheating zone through inlet 209B may pass through a gas distribution means such as Johnson screen laterals so as to more evenly distribute the entering gas across the entire vessel cross-sectional area. Similarly gas distribution means may be employed at gas inlets 208 and 214.

At the bottom of stripping zone 252 is located gas inlet 214. Purge gas entering the stripping zone through inlet 214 is caused to flow upward through the stripping zone and is collected at the top of stripping zone 252 in gas collection means 242. Gas outlet 215 communicates with gas collection means 242 so as to cause purge gas collected in collection means 242 to pass out of vessel 250.

Impurity-containing adsorbent enters vessel 250 through adsorbent inlet 201 and passes down through vessel 250 in countercurrent flow relation to upwardly flowing purge gas through each of the three zones. The adsorbent travels by gravity across perforated trays 240 and down to the next lower tray through downcomers 241 located at the alternating opposite ends of the vertically-spaced trays. The gas flows upwardly through the vessel primarily by passage through the tray perforations. The regenerated adsorbent exits vessel 250 through gas outlet 207.

The process and apparatus of the direct heat exchange temperature swing regeneration system of this invention has been described in detail with reference to certain specific embodiments. It is understood that there are other embodiments within the scope of the claims. For example, the invention discussed with reference to a one-impurity system may be applicable for dual or multi-impurity systems.

I claim:

1. A process for cleaning impurity-containing adsorbent by temperature swing regeneration comprising:
    (a) providing impurity-containing adsorbent and clean purge gas;
    (b) warming the impurity-containing adsorbent by direct heat transfer with warm purge gas to produce warm impurity containing adsorbent and cool purge gas;
    (c) heating the cool purge gas to produce hot purge gas;

(d) cleaning the warm impurity-containing adsorbent by contact with the hot purge gas to produce clean adsorbent and impurity-containing purge gas; and (e) cooling the clean adsorbent by direct heat transfer with the clean purge gas to produce clean cool adsorbent and the warm purge gas of step (2).

2. The process of claim 1 wherein said adsorbent is molecular sieve.

3. The process of claim 1 wherein said adsorbent is silica gel.

4. The process of claim 1 wherein said adsorbent is activated carbon.

5. The process of claim 1 wherein said impurity is carbon dioxide.

6. The process of claim 1 wherein said impurity is water.

7. The process of claim 1 wherein said purge gas is nitrogen.

8. The process of claim 1 wherein said purge gas is oxygen.

9. The process of claim 1 wherein said purge gas is air.

10. The process of claim 1 wherein the heat transfer of steps (2) and (5) and the mass transfer of step (3) are carried out by countercurrent flow of adsorbent and purge gas.

11. The process of claim 1 wherein the impurity-containing purge gas of step (4) is cooled by indirect heat exchange with the cool purge gas of step (2) to provide at least part of the heating of step (3).

12. The process of claim 1 wherein at least part of the heating of step (3) is provided by an external heater.

13. The process of claim 1 wherein the heat transfer of step (2) is carried out in a preheating zone wherein the adsorbent and the purge gas are in equilibrium at a point within the preheating zone.

14. The process of claim 1 wherein the mass transfer of step (4) is carried out in a stripping zone wherein the temperature of the purge gas at all points of said zone exceeds the temperature at which purge gas and adsorbent are in equilibrium with respect to the impurity.

15. An apparatus for temperature swing regeneration of impurity-laden adsorbent by direct heat transfer with purge gas comprising: a vessel having a preheating zone, a stripping zone and a recuperating zone, said preheating zone having a gas outlet at one end and a gas inlet at the opposite end, said stripping zone having a gas inlet at one end and, at the other end, gas collection means in flow communication with a gas outlet, said recuperating zone having a gas inlet at one end and, at the other end, gas collection means in flow communication with a gas outlet, said recuperating zone gas outlet in flow communication with said preheating zone gas inlet.

16. The apparatus of claim 15 wherein said vessel is cylindrical.

17. The apparatus of claim 15 wherein said vessel is vertically oriented.

18. The apparatus of claim 15 wherein at least one of the gas inlets communicates with gas distribution means inside the vessel to more evenly distribute entering gas across the vessel cross-sectional area.

19. The apparatus of claim 15 wherein each zone contains a plurality of vertically-spaced, horizontally-oriented perforated trays.

* * * * *

UNITED STATES PATENT AND TRADEMARK OFFICE
CERTIFICATE OF CORRECTION

PATENT NO.  : 4,511,375

DATED       : April 16, 1985

INVENTOR(S) : W.E. BeVier

It is certified that error appears in the above-identified patent and that said Letters Patent is hereby corrected as shown below:

In column 3, line 64, delete "urge" and substitute therefor --purge--.

In column 4, line 58, delete "Theoreticlaly" and substitute therefor --Theoretically--.

In claim 1, line 3, delete "(a)" and substitute therefor --(1)--.

In claim 1, line 5, delete "(b)" and substitute therefor --(2)--.

In claim 1, line 9, delete "(c)" and substitute therefor --(3)--.

UNITED STATES PATENT AND TRADEMARK OFFICE
CERTIFICATE OF CORRECTION

PATENT NO. : 4,511,375

DATED : April 16, 1985

INVENTOR(S) : W.E. BeVier

It is certified that error appears in the above-identified patent and that said Letters Patent is hereby corrected as shown below:

In claim 1, line 11, delete "(d)" and substitute therefor --(4)--.

In claim 1, line 14, delete "(e)" and substitute therefor --(5)--.

Signed and Sealed this

Twenty-third Day of July 1985

[SEAL]

Attest:

DONALD J. QUIGG

Attesting Officer     Acting Commissioner of Patents and Trademarks